United States Patent
Summers (10) Patent No.: US 10,948,593 B2
(45) Date of Patent: Mar. 16, 2021

(54) SYSTEM FOR DETERMINING DISTANCE BETWEEN FIXED AND MOBILE ENDPOINTS AND RELATED METHODS

(71) Applicant: CITRIX SYSTEMS, INC., Fort Lauderdale, FL (US)

(72) Inventor: Jacob Jared Summers, Coral Springs, FL (US)

(73) Assignee: CITRIX SYSTEMS, INC., Fort Lauderdale, FL (US)

(*) Notice: Subject to any disclaimer, the term of this patent is extended or adjusted under 35 U.S.C. 154(b) by 341 days.

(21) Appl. No.: 16/015,813

(22) Filed: Jun. 22, 2018

(65) Prior Publication Data
US 2019/0391262 A1 Dec. 26, 2019

(51) Int. Cl.
*G01S 15/74* (2006.01)
*H04W 4/02* (2018.01)

(52) U.S. Cl.
CPC ............ *G01S 15/74* (2013.01); *H04W 4/023* (2013.01)

(58) Field of Classification Search
CPC ........ G01S 15/74; G01S 11/16; H04W 4/023; H04W 4/33
See application file for complete search history.

(56) References Cited

U.S. PATENT DOCUMENTS

| | | | |
|---|---|---|---|
| 9,176,744 B2 | 11/2015 | Lee | |
| 9,538,345 B2 | 1/2017 | Sah et al. | |
| 2006/0025897 A1* | 2/2006 | Shostak | G08G 1/017 701/1 |
| 2014/0344446 A1 | 11/2014 | Rjeili et al. | |
| 2015/0365805 A1 | 12/2015 | Bajko et al. | |
| 2016/0219013 A1* | 7/2016 | Lapidous | H04L 61/1511 |
| 2016/0226972 A1* | 8/2016 | Mahankali | G06F 13/14 |
| 2017/0019525 A1* | 1/2017 | Hannon | G01S 5/18 |
| 2019/0391262 A1* | 12/2019 | Summers | H04W 4/023 |

OTHER PUBLICATIONS

Banin et al "Next Generation Indoor Positioning System Based on WiFi Time of Flight" Proceedings of the 26th International Technical Meeting of the Satellite Division of the Institute of Navigation (ION GNSS+ 2013) Abstract Only.
Banin et al. "WiFi FTM and Map Information Fusion for Accurate Positioning" 2016 International Conference on Indoor Positioning and Indoor Navigation (IPIN), Oct. 4-7, 2016, Alcaláde Henares, Spain; pp. 4.
U.S. Appl. No. 15/720,183, filed Sep. 29, 2017 Root et al.

* cited by examiner

*Primary Examiner* — Daniel Pihulic
(74) *Attorney, Agent, or Firm* — Allen, Dyer, Doppelt + Gilchrist, PA (57) ABSTRACT

A system may include a fixed communications device and a mobile communications device each configured to wirelessly communicate at a first frequency and also at a second frequency higher than the first frequency. The fixed communications device and the mobile communications device may cooperate to establish a wireless link via the second frequency, exchange a location signal via the first frequency responsive to establishing the wireless link, communicate via the wireless link using the second frequency and determine respective transmit and receive delays associated with transmission and reception of the location signal via the first frequency, and determine a distance between the fixed communications device and the mobile communications device based upon a time of arrival of the location signal, the transmit and receive delays, and a signal speed associated with the second frequency.

16 Claims, 8 Drawing Sheets

SYSTEM FOR DETERMINING DISTANCE BETWEEN FIXED AND MOBILE ENDPOINTS AND RELATED METHODS

BACKGROUND

A growing number of applications such as navigation, retail, indoor mapping, vehicle automation, etc., rely on highly accurate position information to operate correctly and safely. In an outdoor environment, this positioning signal is often provided by satellite navigation, and more particularly the Global Positioning System (GPS).

However, there are certain drawbacks associated with consumer GPS devices. For example, GPS accuracy is about 9 ft on average, which may not be satisfactory for certain high precision or close quarters applications. Moreover, GPS requires the use of expensive satellite constellations, a very precise and synchronized timing signal, and a clear line of sight between a receiver and the satellites.

As a result, GPS is not well suited for indoor location applications. In such cases, other location methods may be used, such as cellular, WiFi or Bluetooth based location services. These systems generally use the relative received signal strength to provide an estimated range to a transmitting device. As such, these systems are generally not as accurate as systems like GPS and tend to have much more noise in the calculated range values. Moreover, these approaches are also often vulnerable to minor changes such as receiver or transmitting antenna orientation or other environmental disturbances.

Some systems, such as ultrasound RTLS (real-time location services) systems in healthcare applications, utilize fixed position ultrasound devices to provide zone-based location of assets within a healthcare facility. However, such fixed position devices are relatively expensive, and may not scale well when a relatively high degree of accuracy is desired.

SUMMARY

A system may include a fixed communications device and a mobile communications device each configured to wirelessly communicate at a first frequency and also at a second frequency higher than the first frequency. The fixed communications device and the mobile communications device may cooperate to establish a wireless link via the second frequency, exchange a location signal via the first frequency responsive to establishing the wireless link, communicate via the wireless link using the second frequency and determine respective transmit and receive delays associated with transmission and reception of the location signal via the first frequency, and determine a distance between the fixed communications device and the mobile communications device based upon a time of arrival of the location signal, the transmit and receive delays, and a signal speed associated with the second frequency.

In one example implementation, the fixed communications device may transmit the location signal to the mobile communications device, and the mobile communications device may be configured to collect the transmit delay from the fixed communications device via the wireless link and locally calculate the distance. The mobile communications device may include an audio transducer, and the mobile communications device may be configured to receive the location signal via the audio transducer, for example.

By way of example, the first frequency may be in a range of 15 KHz to 20 MHz, and more particularly 18 KHz to 20 KHz. Also by way of example, the second frequency may be in a range of 2.4 GHz to 5.9 GHz. In one example embodiment, the mobile communications device may be configured to launch at least one application based upon the distance between the mobile communications device and the fixed communications device being below a threshold distance. In accordance with another example, the mobile communications device may be configured to cause a virtualization server to initiate a virtual computing session based upon the distance between the mobile communications device and the fixed communications device being below a threshold distance. The location signal may be based upon a pseudorandom sequence, for example.

A related method is also provided for operating a fixed communications device and a mobile communications device each configured to wirelessly communicate at a first frequency and also at a second frequency higher than the first frequency. The method may include establishing a wireless link via the second frequency, exchanging a location signal via the first frequency responsive to establishing the wireless link, communicating via the wireless link using the second frequency and determining respective transmit and receive delays associated with transmission and reception of the location signal via the first frequency, and determining a distance between the fixed communications device and the mobile communications device based upon a time of arrival of the location signal, the transmit and receive delays, and a signal speed associated with the second frequency.

A related non-transitory computer-readable medium is for a mobile communications device including first wireless communications circuitry configured to operate at a first frequency and second wireless communications circuitry configured to operate at a second frequency higher than the first frequency. The non-transitory computer-readable medium may have computer-executable instructions for causing the mobile wireless communications device to perform steps including establishing a wireless link with a fixed communications device via the second wireless communications device, receiving a location signal from the fixed communications device via the first wireless communications circuitry responsive to establishing the wireless link, and communicating with the fixed communications device via the second wireless communications circuitry and determining respective transmit and receive delays associated with transmission and reception of the location signal via the first frequency, and determining a distance to the fixed communications device based upon a time of arrival of the location signal, the transmit and receive delays, and a signal speed associated with the second frequency.

DETAILED DESCRIPTION

The present description is made with reference to the accompanying drawings, in which example embodiments are shown. However, many different embodiments may be used, and thus the description should not be construed as limited to the particular embodiments set forth herein. Like numbers refer to like elements throughout, and prime notation may be used to indicate similar elements in different embodiments.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
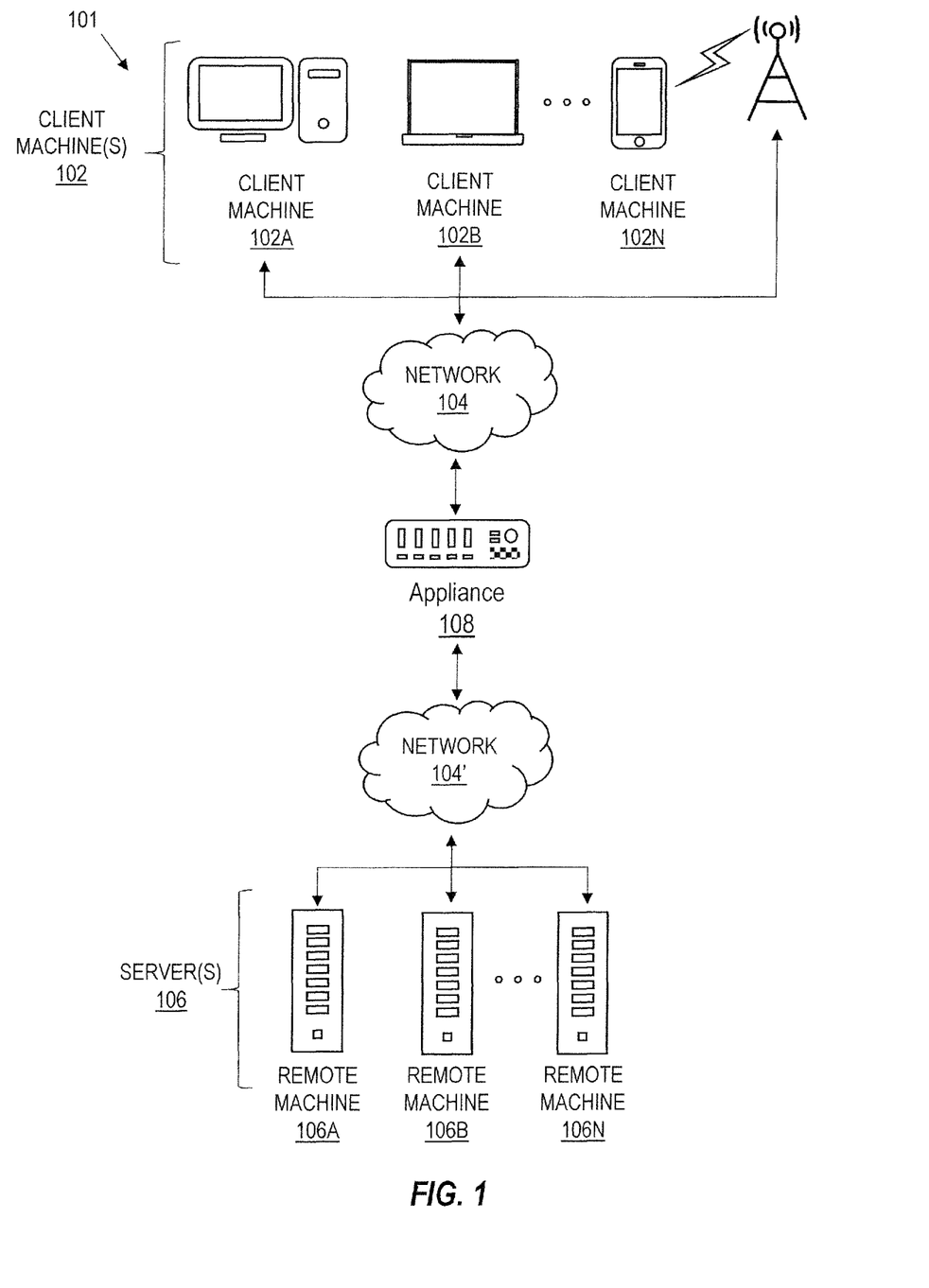
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may also be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation services program or other program that uses a thin-client or a remote-display protocol to capture display output generated by an application executing on a server 106 and transmit the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
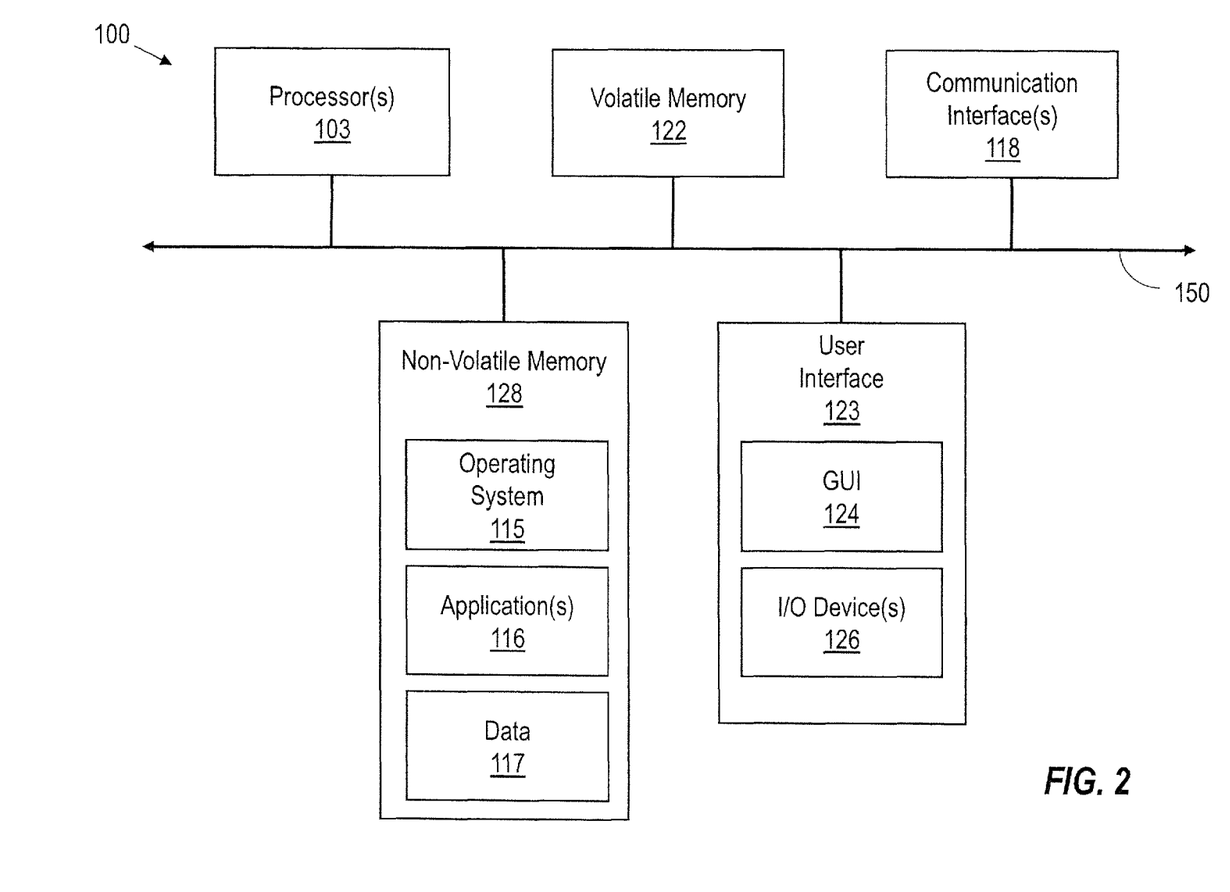
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102, appliances 108 and/or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 103 may be analog, digital or mixed-signal. In some embodiments, the processor 103 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
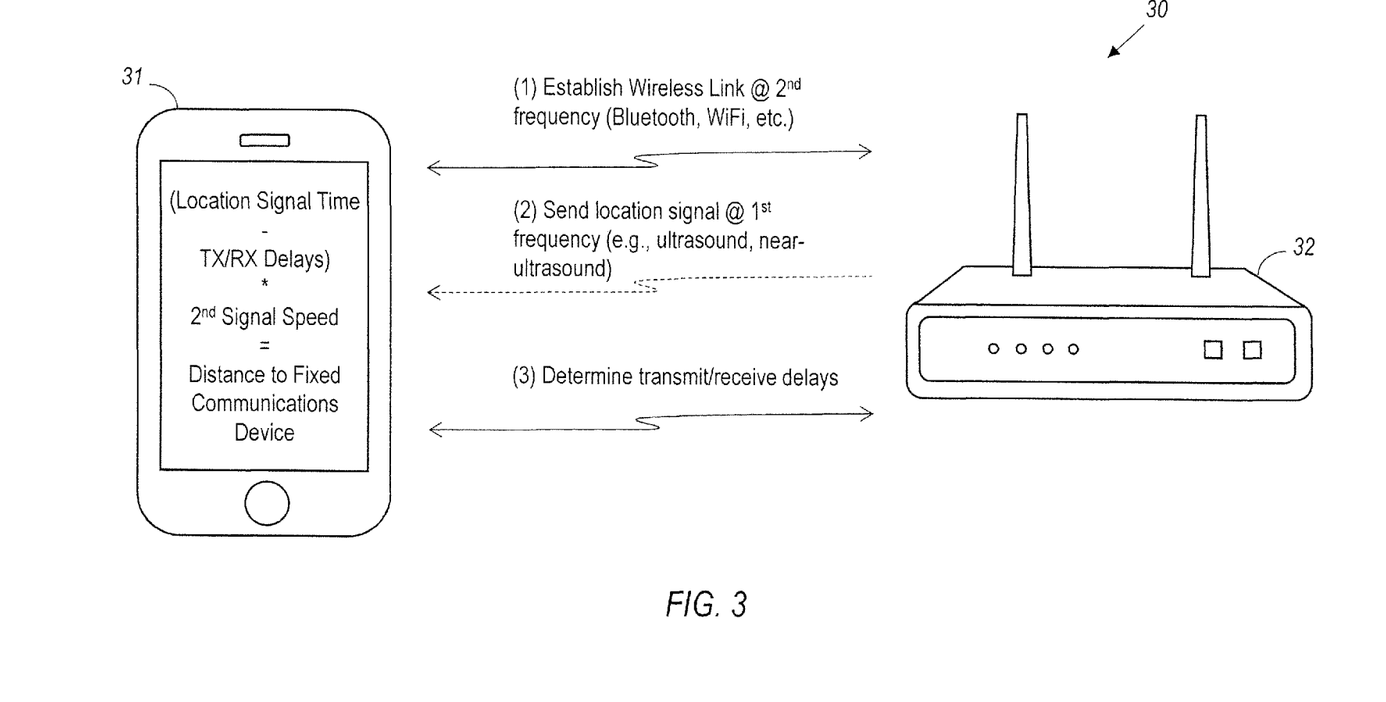
FIG. 3 is a schematic block diagram of a system for providing time-of-flight distance determination to mobile devices using low frequency location signals and a high frequency communications channel.
Figure 4:
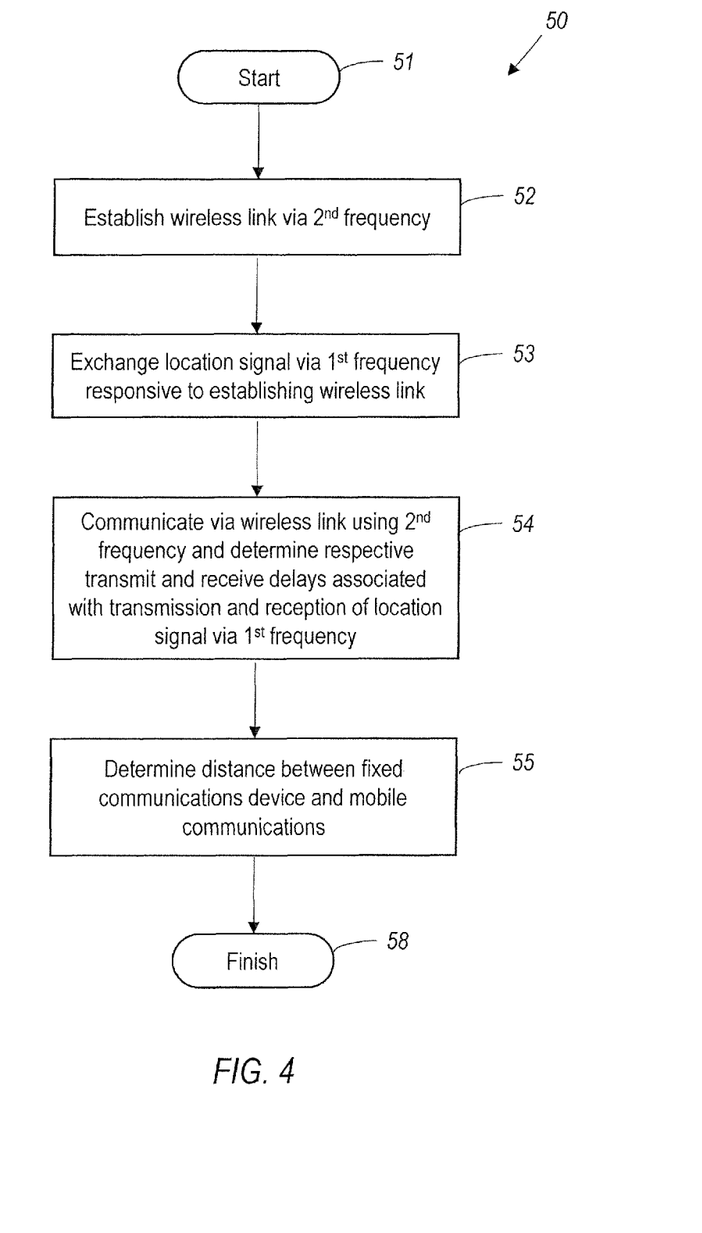
FIGS. 4 and 5 are flow diagrams illustrating method aspects associated with the system of FIG. 3.
Figure 5:
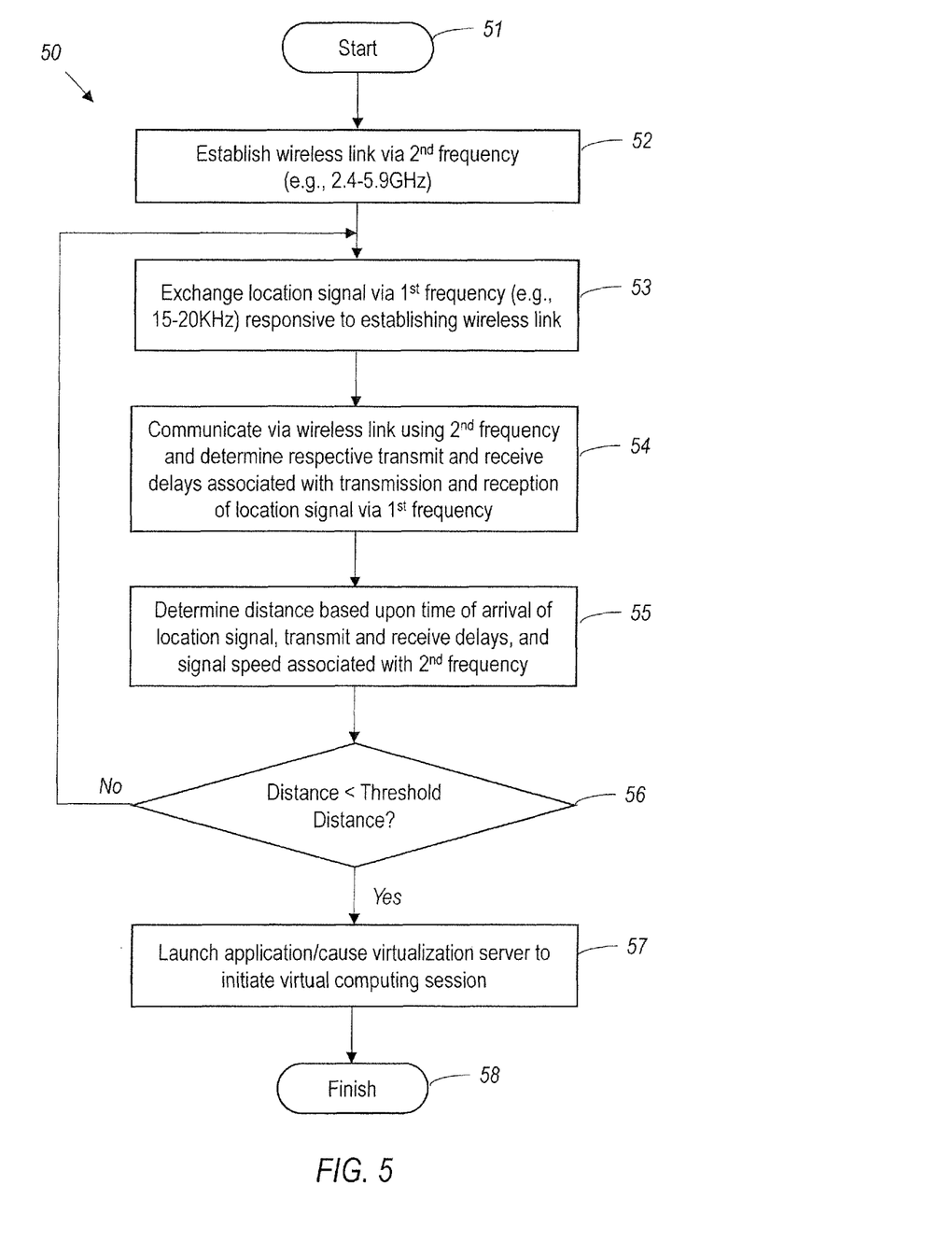

Turning now to FIG. 3 and the flow diagram 50 of FIGS. 4 and 5, a system 30 advantageously provides for relatively high resolution mapping or location of mobile devices 31 relative to a fixed device 32, such as for indoor applications. Beginning at Block 51, the fixed device 32 and the mobile device 31 are each configured to wirelessly communicate at a first (low) frequency, and also at a second frequency that is higher than the first frequency. As such, the fixed device 32 and the mobile device 31 may cooperate to establish a wireless link via the second (high) frequency, at Block 52. By way of example, the second frequency may be in the 2.4 to 5.9 GHz range, such as for Bluetooth and/or wireless local area network (WLAN) or WiFi communications, although other frequency ranges and communications formats may also be used.

Once the wireless link is established at the second (high) frequency, the fixed device 32, in some examples, can transmit a location signal(s) at the first (low) frequency to the mobile device 31, at Block 53. By way of example, the first frequency may be in the ultrasound range (e.g., 20 KHz+), or in the near-ultrasound range (e.g., 15-20 KHz, and more particularly 18-20 KHz), as will be discussed further below. In the illustrated example, a single location signal is sent from the fixed device 32 to the mobile device 31, but in other embodiments multiple location signals may be sent. The mobile device 31 may send a location signal to the fixed device, and/or they may both send one or more location signals in some embodiments.

The mobile device 31 and fixed device 32 may then communicate via the wireless link using the second (high) frequency and determine respective transmit and receive delays associated with transmission and reception of the location signal via the first (low) frequency, at Block 54. In this way, the wireless link effectively operates as a backhaul channel for the mobile device 31 and the fixed device 32 to exchange the requisite information to perform time-of-flight calculations for distance determination, as will be discussed further below.

Generally speaking, the distance between the fixed device 32 and the mobile device 31 may be determined based upon a time of arrival of the location signal, transmit and receive delays, and a signal speed associated with the first frequency, at Block 55. In the case of near-ultrasound signals (i.e., those at the upper end of the audible range for the human ear), such signals travel at the speed of sound.

In the example illustrated in FIG. 3, the fixed device 32 transmits the location signal to the mobile device 31, and the mobile device collects the transmit delay from the fixed device via the wireless link and locally calculates the distance. In the case of near-ultrasound location signals, for example, mobile communications devices (e.g., smartphones, tablet computers, etc.) may already include an audio transducer (e.g., microphone), enabling such mobile devices to receive a near-ultrasound location signal without requiring any new hardware. Similarly, such devices have output speakers which may be used to transmit a near-ultrasound signal also without any hardware upgrades. However, in some embodiments, other communications circuitry/transducers (e.g., ultrasound) may be incorporated in the mobile device 31 in addition to the conventional audio components.

The fixed device 32 may be implemented using relatively simple hardware, such as a Raspberry Pi device, for example. It should be noted that use of the term "fixed" herein with respect to the device 32 simply means that it is in a stationary position when the ranging operations are performed, but it may be portable for use in different locations if desired.

Various actions may be performed based upon the determined distance between the mobile device 31 and the fixed device 32 (Block 57 of FIG. 5). In one example embodiment, the mobile device 31 may be configured to launch or grant access to one or more applications based upon the distance between the mobile device 31 and the fixed device 32 being below a threshold distance (Block 56 of FIG. 5). For example, the threshold distance may be set to approximate the boundary of a building or floor of a building, a property or portion or the property, etc., such that when someone brings the mobile device 31 within the boundary the distance will be below the threshold. In accordance with another example, the mobile device 31 may be configured to cause a virtualization server to initiate (e.g., launch and/or enumerate) a virtual computing session as described above based upon the distance being below the threshold distance. Other examples of actions which may be performed based upon entry of mobile device 31 within a certain boundary or range of a given location are set forth in U.S. Pat. Pub. No. 2014/0344446 and U.S. Pat. Pub. No. 2019/0102211, both of which are assigned to the present Applicant and are hereby incorporated herein in their entireties by reference. A managed access program running on the mobile device 31 (e.g., Citrix Receiver) may be used to perform the ranging calculations and launch an application/virtual session in some embodiments, although other suitable programs or approaches may also be used. The method illustratively concludes at Block 58.

Accordingly, the system 30 advantageously leverages the time-of-flight of a signal transmitted in one or both directions to calculate the range between the mobile device 31 and fixed device 32. Moreover, the system 30 helps overcome drawbacks of approaches such as those described above by separating the location signal acquisition and analysis steps to minimize or eliminate specialized hardware (or with low cost specialized hardware when appropriate or desired) yet still achieve time-of-flight ranging.

Figure 6:
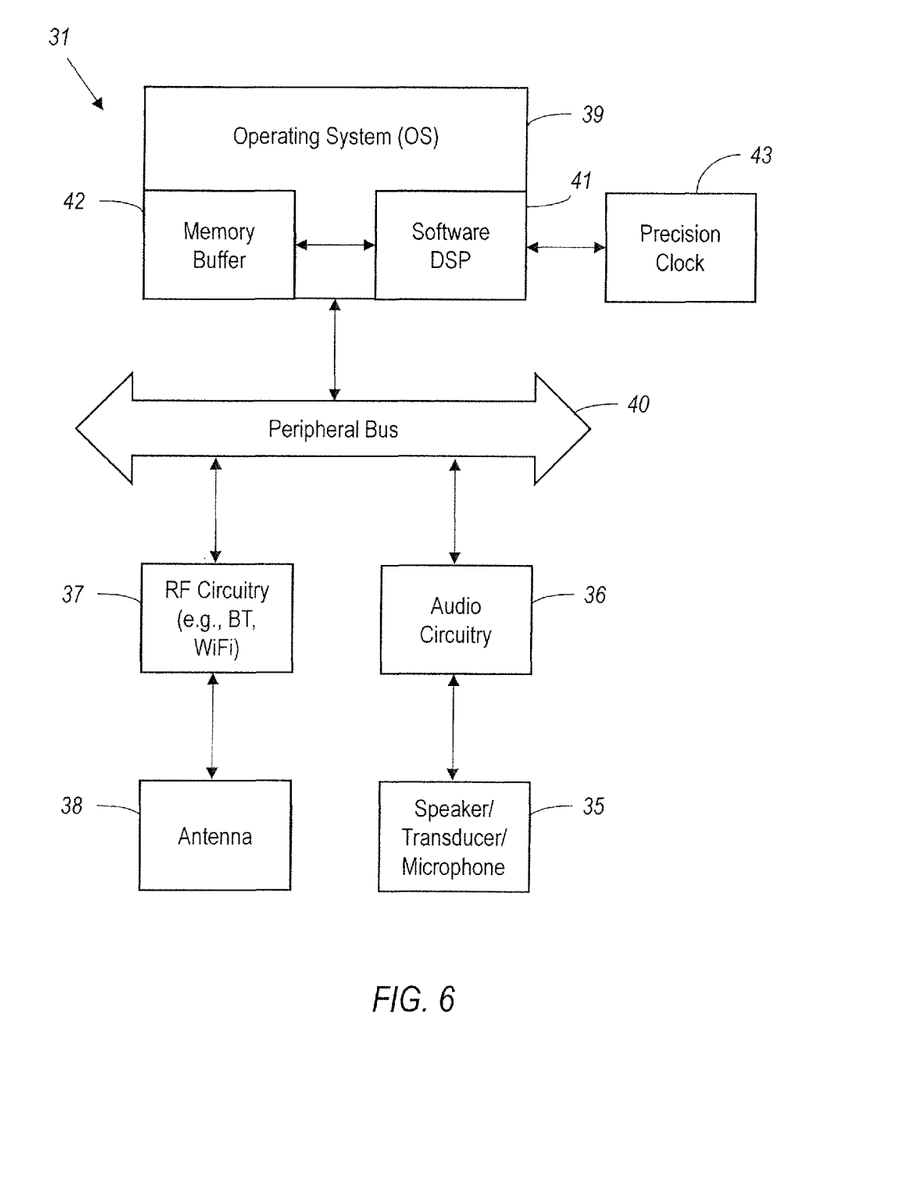
FIG. 6 is a schematic block diagram of an example implementation of a mobile wireless communications device which may be used in the system of FIG. 3.

The foregoing will be further understood with reference to an example configuration of the mobile device 31 now described with reference to FIG. 6. In the illustrated configuration, near-ultrasound frequencies are used for the timed location signal and are received by a transducer 35 (e.g., microphone, although a speaker may be used for near-ultrasound transmission in some embodiments) and associated audio circuitry 36 (e.g., amplifier, filter, A/D converter, etc.). In addition to the advantage of not requiring additional hardware (e.g., employing a microphone likely already included on the mobile device 31) as noted above, another advantage of near-ultrasound over ultrasound is that the speed through air is much lower, thus reducing the timing accuracy needed to calculate an accurate range. For example, timing lower frequency signals requires a less accurate and lower frequency local clock to perform timing comparisons than for higher frequency signals because faster signals will travel farther (and thus result in a greater margin of error in a distance calculation) for relatively lower clock speeds.

Furthermore, the mobile device 31 further illustratively includes wireless radio frequency (RF) circuitry 37 (e.g., WiFi and/or Bluetooth) which utilizes a speed of light communication medium for communications other than the location signal via an antenna 38. As a result, less information has to be communicated via the near-ultrasound (i.e., speed of sound) medium, reducing the error and delay of timing information between the mobile and fixed devices 31, 32. The RF circuitry 37 and audio circuitry 36 communicate with the mobile device operating system (OS) 39 via a peripheral bus 40. In this regard, the OS 39 may utilize a software digital signal processor (DSP) 41 and memory buffer 42 for communicating with and/or controlling the RF circuitry 37 and audio circuitry 36, and the software DSP may receive a reference clock signal from an onboard high-precision clock 43 (e.g., an oscillator). By way of example, typical digital audio circuitry in mobile devices utilizes a 44.1 KHz clock for sampling, and this same clock may also be utilized as the high-precision timer 43 in some embodiments. In accordance with another example, the 26 MHz crystal oscillator (aka "network crystal") found in most smart phones may also be used for the high-precision timer 43 in some implementations.

In accordance with one example implementation, the fixed device 32 transmits a BLE beacon advertisement over Bluetooth. The mobile device 31 discovers the fixed device 32 and connects to it over BLE GATT or via WiFi, for example (i.e., a speed of light medium). The mobile device 31 then begins listening for near-ultrasound signals, and sends a message via Bluetooth or WiFi to the fixed device 32 to transmit the location signal, similar to a "ping". The fixed device 32 accordingly responds with a ping over the time-of-flight medium (near-ultrasound). By way of example, the ping may be an encoded pattern of bytes that are random and unique. The mobile device 31 measures the time of arrival of the location signal.

Furthermore, the mobile device 31 queries the fixed device 32 (via Bluetooth/WiFi) for timing data related to the signal. Any path delays caused by hardware on the fixed device 32 due to delays in the ping request arrival or preparing the ping response are calculated and enumerated along-side any calculated hardware delays. For example, such delays may include known delays associated with signal transmission over a particular bus (e.g., USB), the time between a sound card and audio transducer (e.g., speaker/microphone), etc. The mobile device 31 likewise accumulates hardware delays and calculation timing, and combines these delays with the delays acquired from the fixed device 32 to calculate an overall hardware timing offset. As such, the mobile device 31 may then calculate an estimate for the time of signal exit from fixed device 32 and arrival at the mobile device 31. These estimates can be used to calculate a time-of-flight estimate for a signal and then a distance based on the signal speed (i.e., speed of sound for near-ultrasound). Additional filters (e.g., bandpass, low pass, high pass, etc.) may be used for the signal to account for or guard against reflected or distorted signals, if desired. In some embodiments, normalization of several pings may be used to further improve accuracy and compensate for delays caused by process switching or other jitter factors.

The mobile device 31 accordingly leverages the high-precision timer 43 and collection and aggregation of timing/delay data in an "out-of-band" fashion. This causes the signal being timed to be transmitted in a shorter burst (e.g., 3 ms, and more particularly, 1 ms or less) over the unshared/timed channel (near-ultrasound), and timing data to be collected over a separate shared channel, thereby improving efficiency. Likewise, signal timing and intervals may be managed over the shared channel to select and share appropriate time slots of the unshared channel(s). As a result, this allows the mobile device 31 to know relatively precisely where it is in a space relative to the fixed device 32, or, by proxy, where a user is within a space when it may be assumed that the mobile device 31 is in the user's possession.

As a result, in contrast to time-of-flight ultrasound ranging which is generally performed in real-time and relies on ultrasound echoes from a paired set of transducers on a single device, the above-described approach advantageously allows for time-of-flight reading between standard computing devices and hardware. Moreover, by calculating and transmitting the observed timing delays during signal transmission and acquisition, an accurate time-of-flight ranging may be performed without the use of (or with more limited use of) real-time systems, thereby allowing the calculations to be performed in non-real-time operating systems.

Furthermore, by using both a "speed of sound" (e.g., ultrasound) transmission with a "speed of light" (e.g., radio frequency) connection, the system 30 allows for better optimization of the ultrasound or near-ultrasound sending and receiving devices, such that the receiver listens only in a narrower window, and the transmitter may operate at a higher power (i.e., louder), which may be appropriate when the fixed device 32 is the low frequency transmitter (i.e., larger speakers may be more readily used).

As such, the system 30 advantageously provides the ability to track critical devices within a space based on peer-to-peer ranging between established devices in the space. The system 30 also reduces the use of real-time hardware to estimate distances between two radios by leveraging point-to-point radio signals based on time-of-flight of the signals and not requiring a relatively complex synchronization of clocks between the two.

As noted above, either the mobile device 31 or the fixed device 32 may transmit the low frequency location signal. Moreover, rather than the mobile device 31, the fixed device 32 may perform the distance calculations in some embodiments (or they may be offloaded to a separate server, etc.). However, allowing the mobile device 31 to make such calculations, and using the fixed device 32 merely as a "beacon", keeps the mobile device in control of information relating to its location, which may be important in certain applications. That is, a user may still be able to achieve all of the benefits of ranging (e.g., pre-launching and/or enumerating computer applications or virtual sessions, etc.) for a better user experience, yet without giving up any personal information relating to the user's whereabouts, for example.

Figure 7:
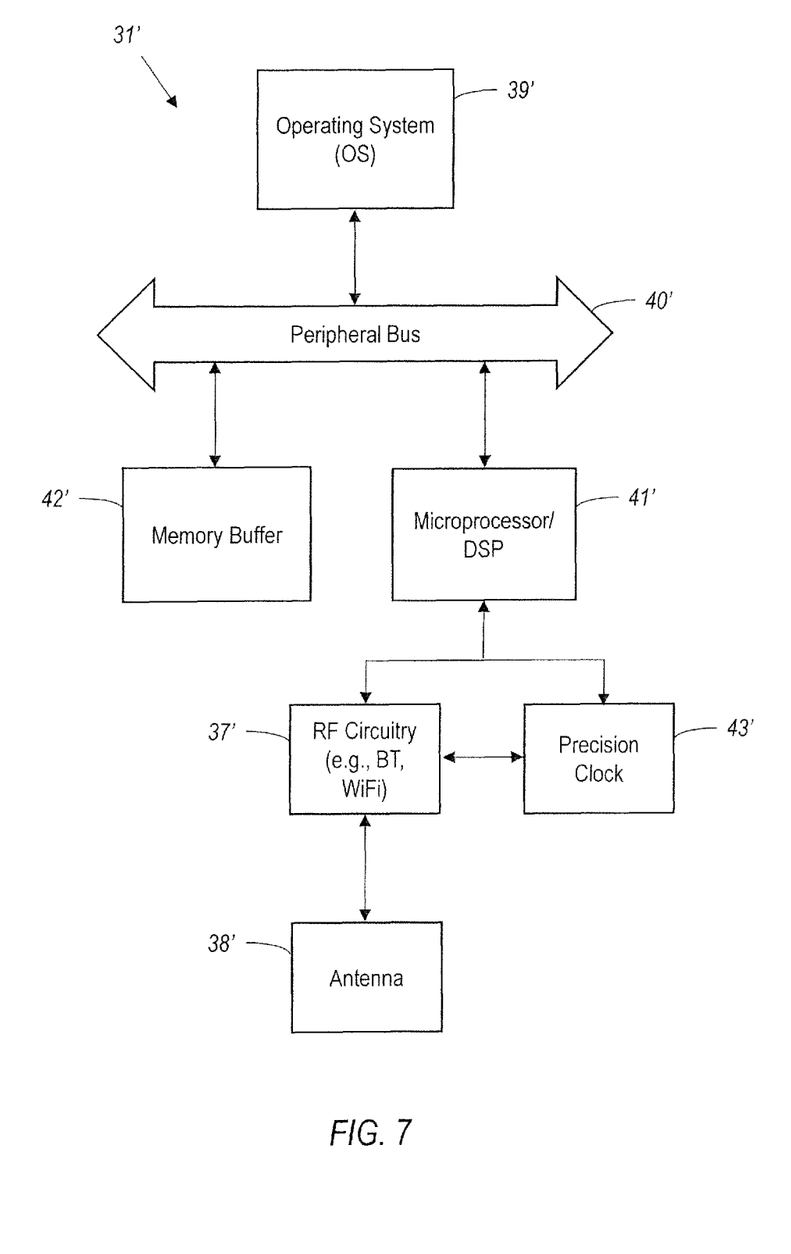
FIG. 7 is a schematic block diagram of a mobile wireless communications device which may be used in the system of FIG. 3 in accordance with another example embodiment.
Figure 8:
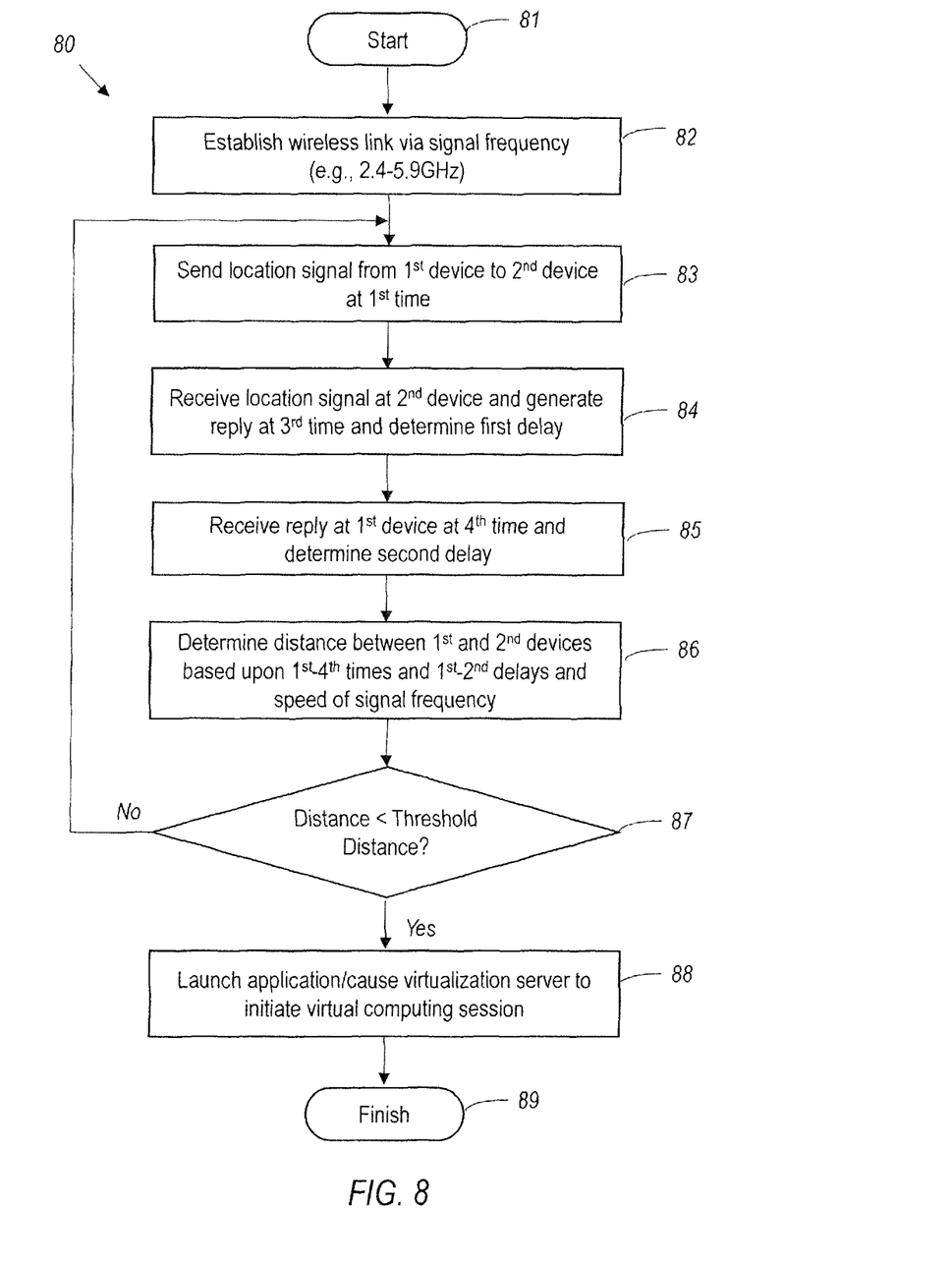
FIG. 8 is a flow diagram illustrating example method aspects associated with the system of FIG. 7.

Turning now to FIG. 7 and the flow diagram 80 of FIG. 8, another embodiment of the mobile device 31' is described for use in a configuration in which a time-of-flight based calculation is made over a purely speed of light based medium (e.g., WiFi or Bluetooth) without a separate low frequency channel (e.g., ultrasound or near-ultrasound). In this example, the components 37', 38', 39', 40' and 43' are similar to their counterparts 37, 38, 39, 40 and 43 in FIG. 6, but the DSP 41' and buffer 42' are implemented as separate hardware components which communicate with the OS 39' via the peripheral bus 40'.

In this configuration, the components of the hardware radios on each side of the transmission will be used to supplement the timing delay information, allowing the data to be passed along with the packets themselves or queried later to produce the timing delay data needed for accurate distance calculations. Beginning at Block 81, after performing the Bluetooth discovery and establishing the wireless link (either WiFi or Bluetooth) described above (Block 82 of FIG. 8), a specially crafted packet or a special header flag is added to a packet being sent at a location signal to indicate a range calculation is to be performed (Block 83 of FIG. 8). With sufficient resources, this ranging may be performed automatically on every packet sent, although not required in all embodiments. Although described below as the ranging operation originating from mobile device 31', this is merely illustrative, and the ranging operation may additionally or alternatively originate from fixed device 32.

The DSP 41' of mobile device 31' may determine that ranging should be performed based on the outgoing packet. A reading of the high-precision timer 43' (which may be similar to the described above, or an application specification timer in some embodiments) may then be performed to determine an outbound time of the packet from mobile device 31'. The timer reading may be written back into an OS memory buffer associating the timing with the packet. The packet is received by the RF radio circuitry 37' of fixed device 32 and a similar timing of the arrival of the packet is performed to determine an inbound time of the packet at fixed device 32, as well as any hardware delays associated with the receipt of the incoming signal from the mobile device 31' and transmission of a reply thereto (Block 84 of FIG. 8).

A reply/response or acknowledgement (ACK) may be calculated for the timing packet, and its outbound timing similarly computed to determine an outbound response time from fixed device 32, and the response is transmitted to the mobile device 31' (Block 85 of FIG. 8). The timing and delay data for the fixed device 32 may be added through tags/headers or packet body to the response itself, or queried separately by the mobile device 31 in this step. The round-trip time (RTT) is computed as follows:

RTT=((Inbound time of response at mobile)−(Outbound Time of original packet from mobile))−((outbound response time at fixed device)−(inbound time of original timing packet at fixed device))−(hardware timing offsets).

The distance D is then calculated by D=(RTT/2)*"Speed of light" (Block 86 of FIG. 8). As noted above, various actions may be performed responsive to the calculated distance being within a threshold (e.g., launch or grant access to an application(s), etc.), at Blocks 87-88, which illustratively concludes the method of FIG. 8 (Block 89).

This configuration accordingly uses high precision timing data and an approach to retrieve that timing data from existing wireless protocol hardware like Bluetooth and WiFi radios. This approach differs from others in which the range calculations would not be performed necessarily by the same real-time hardware that is receiving and timing the signals. Rather, the signals themselves may be irrelevant or may have been repurposed from existing connections through tags or header flags. The relevant timing data for these signals is retrieved on the side, after the fact, and computed into a range estimate. By leveraging relative timing in this way, the present approach allows for high precision clocks or other specialty hardware to be switched on and off on demand. As such, the high speed clock need only run when performing a range calculation to help improve battery life on mobile devices. It should also be noted that similar components to those shown in the mobile device 31 in FIG. 7 would also be present in the fixed device 32 in this embodiment.

Many modifications and other embodiments will come to the mind of one skilled in the art having the benefit of the teachings presented in the foregoing descriptions and the associated drawings. Therefore, it is understood that the foregoing is not to be limited to the example embodiments, That which is claimed is:

1. A system comprising:
a fixed communications device at a building and a mobile communications device each configured to wirelessly communicate at a first frequency and also at a second frequency higher than the first frequency, the fixed communications device and the mobile communications device cooperating to
establish a wireless link via the second frequency,
exchange a location signal via the first frequency responsive to establishing the wireless link,
communicate via the wireless link using the second frequency and determine respective transmit and receive delays associated with transmission and reception of the location signal via the first frequency,
determine a distance between the fixed communications device and the mobile communications device based upon a time of arrival of the location signal, the transmit and receive delays, and a signal speed associated with the second frequency; and
cause a virtualization server to initiate a virtual computing session based upon the distance between the mobile communications device and the fixed communications device being below a threshold distance relative to the building.

2. The system of claim 1 wherein the fixed communications device transmits the location signal to the mobile communications device; and wherein the mobile communications device is configured to collect the transmit delay from the fixed communications device via the wireless link and locally calculate the distance.

3. The system of claim 1 wherein the mobile communications device comprises an audio transducer; and
wherein the mobile communications device is configured to receive the location signal via the audio transducer.

4. The system of claim 1 wherein the first frequency is in a range of 15 KHz to 20 MHz.

5. The system of claim 1 wherein the first frequency is in a range of 18 KHz to 20 KHz.

6. The system of claim 1 wherein the second frequency is in a range of 2.4 GHz to 5.9 GHz.

7. The system of claim 1 wherein the location signal is based upon a pseudorandom sequence.

8. A method for operating a fixed communications device at a building and a mobile communications device each configured to wirelessly communicate at a first frequency and also at a second frequency higher than the first frequency, the method comprising:
establishing a wireless link between the mobile communications device and the fixed communications device via the second frequency;
exchanging a location signal between the mobile communications device and the fixed communications device via the first frequency responsive to establishing the wireless link;
communicating between the mobile communications device and the fixed communications device via the wireless link using the second frequency and determining respective transmit and receive delays associated with transmission and reception of the location signal via the first frequency;
determining a distance between the fixed communications device and the mobile communications device based upon a time of arrival of the location signal, the transmit and receive delays, and a signal speed associated with the second frequency; and
causing a virtualization server to initiate a virtual computing session based upon the distance between the mobile communications device and the fixed communications device being below a threshold distance relative to the building.

9. The method of claim 8 wherein the fixed communications device transmits the location signal to the mobile communications device; and wherein the mobile communications device is configured to collect the transmit delay from the fixed communications device via the wireless link and locally calculate the distance.

10. The method of claim 8 wherein the mobile communications device comprises an audio transducer; and
wherein exchanging comprises receiving the location signal at the mobile communications device via the audio transducer.

11. The method of claim 8 wherein the first frequency is in a range of 15 KHz to 20 MHz.

12. The method of claim 8 wherein the second frequency is in a range of 2.4 GHz to 5.9 GHz.

13. A non-transitory computer-readable medium for a mobile communications device comprising first wireless communications circuitry configured to operate at a first frequency and second wireless communications circuitry configured to operate at a second frequency higher than the first frequency, the non-transitory computer-readable medium having computer-executable instructions for causing the mobile wireless communications device to perform steps comprising:
establishing a wireless link with a fixed communications device at a building via the second wireless communications device;
receiving a location signal from the fixed communications device via the first wireless communications circuitry responsive to establishing the wireless link;
communicating with the fixed communications device via the second wireless communications circuitry and determining respective transmit and receive delays associated with transmission and reception of the location signal via the first frequency;
determining a distance to the fixed communications device based upon a time of arrival of the location signal, the transmit and receive delays, and a signal speed associated with the second frequency; and
causing a virtualization server to initiate a virtual computing session based upon the distance between the mobile communications device and the fixed communications device being below a threshold distance relative to the building.

14. The non-transitory computer-readable medium of claim 13 wherein the first frequency is in a range of 15 KHz to 20 MHz.

15. The non-transitory computer-readable medium of claim 13 wherein the second frequency is in a range of 2.4 GHz to 5.9 GHz.

16. The non-transitory computer-readable medium of claim 13 further having computer-executable instructions for causing the mobile communications device to launch at least one application based upon the distance being below a threshold distance.

* * * * *